Jan. 24, 1956 J. H. HOEKSEMA 2,731,969
CORN HUSKER HAVING SHELLED CORN SEPARATOR
Filed Nov. 7, 1951
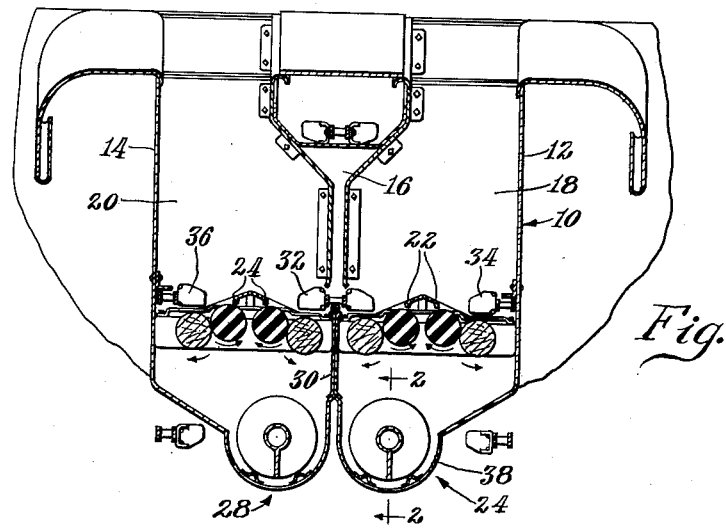
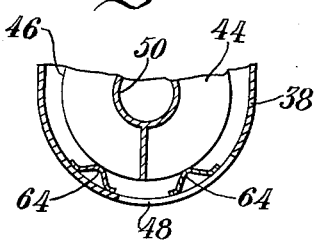
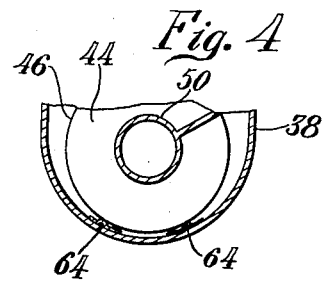
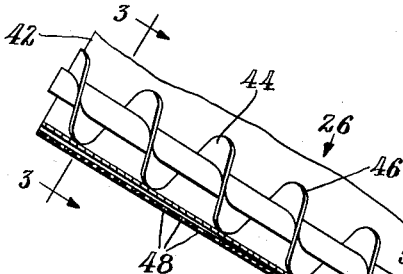
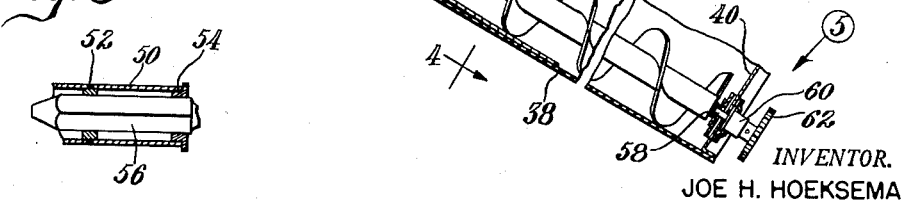
INVENTOR.
JOE H. HOEKSEMA

United States Patent Office 2,731,969
Patented Jan. 24, 1956

2,731,969
CORN HUSKER HAVING SHELLED CORN SEPARATOR

Joe H. Hoeksema, Des Moines, Iowa, assignor to Deere Manufacturing Co., Dubuque, Iowa, a corporation of Iowa Application November 7, 1951, Serial No. 255,256

4 Claims. (Cl. 130—5)

This invention relates to a corn husking machine and more particularly to improved means for separating husks and shelled corn that result from the operation of corn husking.

The conventional corn husker, particularly that which is furnished as part of a mobile corn picker, comprises a plurality of parallel husking rolls over which ears of corn are moved. The rolls cooperate to remove the husks from the corn ears and to discharge the husks downwardly. As an incident to the husking operation, a considerable quantity of shelled corn is discharged along with the husks. Conventionally, the husks and shelled corn are received in an elongated trough running below the husking rolls and an auger conveyor or its equivalent is utilized to move the husks and shelled corn over a perforated bottom in the trough. The perforations in the trough bottom are of such size as to permit passage therethrough of the shelled corn and the shelled corn is delivered to a hopper along with the husked ears, while the husks are separately discharged so as not to be commingled with the ears and kernels.

It is an object of the present invention to provide improved husk-receiving means comprising a trough having a perforated bottom and provided with longitudinally running bearing strips to support the auger in slightly spaced relation to the bottom of the trough. It is a feature of this design to facilitate the passage of kernels through the perforated bottom, since in conventional constructions in which the auger rides directly on the bottom, it occurs more often than not that the kernels are moved so rapidly as to be carried across the perforations and thus to be discharged with rather than apart from the husks.

Another feature of the invention is the provision of a removable connection of the auger to the input or power source therefor, whereby the auger may be readily removed for the purposes of cleaning the auger trough. This feature is also useful in permitting the temporary disengagement of the auger from its power source so that the machine may be operated idly; that is, without any material being conveyed by the auger. This is sometimes important for the purposes of testing a machine or for breaking the machine in. In such cases, it is desirable to disconnect the drive to the auger so that the rotating auger will not cut through the conveyor bottom.

The foregoing and other important objects and desirable features inherent in and encompassed by the invention will become apparent as a preferred embodiment of the invention is disclosed in the following detailed description and accompanying sheets of drawings wherein Figure 1 is a transverse sectional view through a husking mechanism;

Figure 2 is a fragmentary longitudinal section as seen substantially along the line 2—2 of Figure 1;

Figures 3 and 4 are transverse sectional views, each on an enlarged scale, as seen respectively along the lines 3—3 and 4—4 of Figure 2; and Figure 5 is an enlarged sectional view of that portion of the disconnectible drive to the auger as indicated by the encircled numeral 5 in Figure 2;

The husking mechanism shown in Figure 1 may be taken as representative of a conventional design and, to the extent that the illustrated construction differs from conventional constructions, details will be ignored, since these form the subject matter of assignee's copending application, Ser. No. 251,746, filed October 17, 1951.

The illustrated husking mechanism comprises a husking box 10 having opposite side walls 12 and 14 and a central dividing wall structure 16 which separates the husking box 10 into right- and left-hand compartments 18 and 20.

It will be understood by those familiar with the corn husking art that the box 10 is of elongated construction. Each compartment is provided at a lower portion thereof with a plurality of parallel husking rolls, 22 for the compartment 18 and 24 for the compartment 20. Husk-receiving means 26 and 28 are disposed respectively below the rolls 22 and 24. The two husking means are separated by a divider wall 30. Corn ears delivered to the husking box 10 are moved lengthwise of the two compartments 18 and 20 by a common central chain conveyor 32 and by a pair of outer conveyors 34 and 36. As the rolls 22 and 24 rotate respectively in the directions indicated, husks are removed from the ears and discharged downwardly into the husk-receiving means 26 and 28.

Since the two compartments 18 and 20 and the husk-receiving means 26 and 28 respectively therefor are symmetrical, a description of one will suffice for both. Therefore, for the purposes of further description, reference will be had to Figures 2 through 5 on the basis of the design of the husk-receiving means 26.

This husk-receiving means comprises an elongated trough 38 normally inclined at the angle shown in Figure 2. The husking rolls from which the trough receives husks and shelled corn are at about the same angle. The lower end of the trough 38 is closed by a transverse wall 40 and the upper end of the trough is open as at 42 to provide for the discharge of husks. Husks and shelled corn received in the trough 38 are moved toward the open discharge end 42 by means of a rotatable auger conveyor 44. The axis of rotation of the auger 44 lies, of course, lengthwise of the trough 38.

The auger has a helical flight 46 that has its edge lying on a cylinder about the auger axis. The bottom portion of the trough 38 is perforated at 48 adjacent its open or discharge end 42 to permit incidental shelled corn to sift therethrough as the husks and such shelled corn are moved rearwardly. Thus, the shelled corn is discharged through the perforations directly downwardly to be received by any suitable hopper (not shown) and the husks will be discharged at 42 beyond such hopper.

The auger comprises a central core or hollow shaft 50 on which the helical flight 46 is wound. As best shown in Figure 5, the forward end of the core or hollow shaft is provided with a pair of transversely spaced apart circular members 52 and 54, each of which is provided with a non-circular (preferably square) aperture to receive a squared stub shaft 56. This stub shaft is an extension of an input shaft 58 journaled in a bearing 60 carried by the trough end wall 40 and having keyed thereto outside the trough a driven sprocket 62, the source of power for which may be of any suitable nature. The bearing 60 is of such character as to hold the shaft 58 and its squared extension 56 against axial movement. The squared extension 56 is slidably but non-rotatably received by the apertured members 52 and 54, each of the latter being rigidly secured, as by welding, within the front portion of the hollow shaft or auger core 50. Thus, the auger 44 may be axially separated from the extension shaft 56. In the present case, since the end 42 of the auger trough 38 is open, the auger may be withdrawn completely.

As mentioned above, it is a feature of the invention to provide for more efficient separation of the shelled corn from the husks in the auger trough 38. As best seen in Figures 3 and 4, the auger 44 is of smaller diameter than the inside of the trough 38. As will appear in Figure 2, the bottom portion of the auger trough diverges rearwardly relative to the axis of the auger. Stated otherwise, the axis of the auger and the bottom of the trough are non-parallel. The non-parallelism may be carried out relative to the side wall portions of the trough 38, as will appear in Figure 4. Because of this relationship, the radial spacing between at least the bottom portion of the trough and the edge of the auger flight 46 increases uniformly toward the rear or open end 42 of the auger trough. The auger is supported by its flight in the relationship just defined by means running lengthwise of the auger and providing a pair of longitudinal ribs 64 secured to and upstanding from the interior surface of the bottom of the auger trough. These ribs are in circumferentially spaced relationship below the auger and the flight 46 of the auger thus rides on these ribs. The design of each rib is such that it converges relative to the bottom of the trough toward the closed end of the trough. In other words, the bearing edge of each rib is parallel to the axis of the auger. As will be seen in Figures 2 and 3, the higher portions of the ribs 64 are in the zone of the perforations 48 in the bottom of the auger trough. These ribs support the flight 46 of the auger in such position as to facilitate the sifting of shelled corn through the perforations 104. That is to say, the flight 46 of the auger does not ride directly on the bottom of the trough in the zone of the perforations 48. Hence, the possibility of the auger piling up a mass of shelled corn and moving it rapidly past the perforations is eliminated. Since the husks are considerably larger than the kernels of shelled corn, the auger is still effective to move the husks for discharge out the open end 42 of the auger trough.

Each rib has a cross sectional shape substantially in the form of an inverted V with side flanges by means of which affixation to the auger trough may be achieved as by welding. Any equivalent substitute could, of course, be used.

As suggested above, the features of design for the husk-receiving means 26 are duplicated symmetrically in the husk-receiving means 28. It is therefore deemed unnecessary to repeat a detailed description for the means 28.

It will be readily seen that the preferred design is characterized largely by simplicity and efficiency and that it can be used with any conventional husking means. Other features of the invention not specifically enumerated herein will undoubtedly occur to those versed in the art and various modifications and alterations in the preferred embodiment of the invention illustrated may be readily achieved without departing from the spirit and scope of the invention.

What is claimed is:

1. In corn husking mechanism having a husking bed for receiving unhusked corn ears and including husking devices for removing husks from such ears and for discharging such husks and incidental shelled corn downwardly through the bed, the improvement comprising: an auger rotatable below the husking bed to receive such husks and shelled corn and being formed with a helical flight having its edge on a cylinder about the axis of rotation of the auger; a trough embracing the auger from below and running lengthwise thereof from a closed end at one end of the auger to an open end at the opposite end of the auger, said trough being substantially U-shaped in cross-section throughout to provide contiguous interior bottom and side portions respectively below and at opposite sides of the auger, at least said bottom portion diverging relative to the axis of the auger from the closed end toward the open end of the trough so that the radial space between the edge of the flight and said bottom portion increases toward said open end of the trough; said bottom portion being perforated to provide for the passage of shelled corn therethrough; and a plurality of rib means running lengthwise of and fixed to said bottom portion of the trough in circumferentially spaced relation below the auger, each of said ribs having an auger flight-engaging edge lying on a line parallel to the auger axis for supporting the auger in the trough.

2. In corn husking mechanism having a husking bed for receiving unhusked corn ears and including husking devices for removing husks from such ears and for discharging such husks and incidental shelled corn downwardly through the bed, the improvement comprising: a husk-receiving trough disposed below the bed for receiving husks and having a closed end and an opposite open end; a husk-conveying auger rotatable in the trough to move husks toward the open end of the trough and having opposite end portions respectively proximate to the ends of the trough; said trough being perforated adjacent its open end to permit such shelled corn to sift therethrough; bearing means coaxial with the auger at only the closed end of the trough for supporting the proximate end of the auger; and means running lengthwise of the trough and secured to and upstanding from the interior of the trough in the zone of the perforations and below the auger and providing angularly spaced ribs on which the periphery of the auger rides in radially spaced relation to the bottom of the trough at the open end of the trough.

3. For corn husking mechanism having a husk-receiving and conveying auger formed with a helical flight having its edge on a cylinder about the axis of rotation of the auger: a trough positionable to embrace the auger from below to run lengthwise thereof and having a closed end and an open end, said trough being substantially U-shaped in cross-section throughout to provide contiguous interior bottom and side portions, at least said bottom portion diverging from the closed to the open end of the trough relative to the auger axis; said bottom portion being perforated to permit shelled corn mingled with husks to sift therethrough; and a plurality of rib means running lengthwise of the trough and fixed to and upstanding from the interior of said bottom portion, said rib means being spaced apart transversely to the length of the trough and converging relative to the bottom of the trough from the open toward the closed end of the trough.

4. For corn husking mechanism having a husk-receiving and conveying auger formed with a helical flight: a trough positionable to embrace the auger from below to run lengthwise thereof and having a closed end and an open end, said trough being substantially U-shaped in cross-section throughout to provide contiguous interior bottom and side portions and having means at only the closed end thereof for journaling the auger at only one end; said bottom portion being perforated to permit shelled corn mingled with husks to sift therethrough; and means running lengthwise of the trough and fixed to and upstanding from the interior of said bottom portion in the zone of said perforations and providing angularly spaced ribs on which the flight of the auger may ride in radially spaced relation to the bottom of the trough at the open end of the trough.

References Cited in the file of this patent

UNITED STATES PATENTS

| | | |
|---|---|---|
| 718,902 | Berry | Jan. 20, 1903 |
| 1,033,377 | Bohn | July 23, 1912 |
| 1,906,247 | Buff | May 2, 1933 |
| 2,044,043 | Anderson | June 16, 1936 |
| 2,420,543 | Johnson et al. | May 13, 1947 |
| 2,431,016 | Andrews | Nov. 18, 1947 |
| 2,443,942 | Winkler et al. | June 22, 1948 |
| 2,496,764 | Whitney | Feb. 7, 1950 |
| 2,622,382 | Slavens | Dec. 23, 1952 |

FOREIGN PATENTS

| | | |
|---|---|---|
| 808,763 | France | Nov. 24, 1936 |
| 535,005 | Great Britain | Mar. 25, 1941 |